(12) United States Patent
Lawler et al.

(10) Patent No.: US 11,388,352 B2
(45) Date of Patent: Jul. 12, 2022

(54) CAMERA ARRAY

(71) Applicant: Drivingplates.com LLC, Yelm, WA (US)

(72) Inventors: Michael Shawn Lawler, Yelm, WA (US); Ian Sharples, Epsom (GB)

( * ) Notice: Subject to any disclaimer, the term of this patent is extended or adjusted under 35 U.S.C. 154(b) by 0 days.

(21) Appl. No.: 17/373,721

(22) Filed: Jul. 12, 2021

(65) Prior Publication Data
US 2022/0014686 A1 Jan. 13, 2022

Related U.S. Application Data

(60) Provisional application No. 63/050,365, filed on Jul. 10, 2020.

(51) Int. Cl.
| | |
|---|---|
| *H04N 5/247* | (2006.01) |
| *H04N 5/232* | (2006.01) |
| *G01S 17/86* | (2020.01) |
| *B60R 11/04* | (2006.01) |
| *H04N 5/225* | (2006.01) |

(52) U.S. Cl.
CPC ............. *H04N 5/247* (2013.01); *B60R 11/04* (2013.01); *G01S 17/86* (2020.01); *H04N 5/2253* (2013.01); *H04N 5/23203* (2013.01)

(58) Field of Classification Search
None
See application file for complete search history.

(56) References Cited

U.S. PATENT DOCUMENTS

| | | | | |
|---|---|---|---|---|
| 8,576,286 B1* | 11/2013 | Childs | ................. | H04N 13/246 348/148 |
| 10,455,211 B2* | 10/2019 | Schmit | ................. | H04N 5/2254 |
| 10,880,474 B1* | 12/2020 | Thomas | ................. | H04N 5/04 |

* cited by examiner

*Primary Examiner* — James M Anderson, II

(57) ABSTRACT

A plurality of outward-facing cameras, arranged in nodal clusters surrounding and mounted to the top plate of a plate structure, with the plate structure having an elevated platform for an additional upward-facing camera. The nodal clusters and the configuration of clusters on the top plate enable overlaps in coverage between clusters and more informationally dense coverage within each cluster.

20 Claims, 11 Drawing Sheets

CAMERA ARRAY

PRIORITY CLAIM

This application claims the benefit of and priority to U.S. Provisional Application Ser. No. 63/050,365, filed Jul. 10, 2020. The above referenced application is incorporated in its entirety as if restated in full.

BACKGROUND

Currently there are a number of solutions for providing a camera array that captures multiple directions simultaneously. Some of these solutions arrange the cameras in a "rosette formation" and some utilize a camera overlap formation. The "rosette formation" is by far the most utilized, but it fails to meet the standards of the industry because there is considerably less overlap and increased parallax. With all cameras facing out and away from each other, those formations will inherently result in less favorable results.

Parallax is an optical displacement of an apparent position that occurs when an object is seen from more than one position. Each position reveals a distinct "face" or angle of the object as well as different contextual facts, i.e., the object's position vis-à-vis other objects. The different views are utilized in stereopsis, a mental process in which an observer judges object distance, but the difference creates a parallax error in photography. A parallax error may occur with respect to a single camera shot if the lens viewer differs in position from the capture lens, although here the error is merely that the view seen through the viewer is not the view that is actually captured via the lens. This kind of parallax error is relatively trivial, and can be overcome by merging the viewer with the lens.

A more significant kind of parallax error occurs if an object or view is captured via multiple shots, since the shots cannot simply be stitched together to produce a single natural image. In particular, the views will not align since any particular object in each of the shots will be seen from a different perspective and therefore reveal a face that is not duplicated across the shots. Even if the faces are stitched together at their seams to create a single object, that single object may look unnatural, depending on the displacement of positions. But more importantly, that object will not have the same position with respect to other objects in the shots, and it may be impossible to stitch together multiple objects due to occlusion configurations. Occlusion configurations occur as the line of a sight of a particular view converges with the line on which the objects are both positioned, with complete occlusion occurring when the line of sight is the same as the positional line.

At the same time, it is desirably to exploit this kind of parallax error in the sense that the multiple faces captured provide additional information in that the objects may be seen more completely.

Compounding the parallax error described above is the natural warping effect of a camera lens. Multiple shots, made by cameras directed at adjacent areas, will produce a reoccurring warping pattern—specifically, a radial Moire pattern. If the shots are stitched together, a pattern of central (i.e., magnified) to peripheral warping will repeat across the panorama.

Another kind of parallax error occurs if there is insufficient overlap between the camera views. Objects that are positioned at an angle between the views of each camera may be entirely absent from the shots. This problem is more likely to occur the closer the objects are to the cameras and the further the cameras are from one another. Because of the material depth of the devices themselves, multiple cameras cannot originate at a common "origin", even if the angle of their views intersect at such an origin. Therefore, although such object omissions may be mitigated by placing the cameras closer together, there is a limit to this solution imposed by the material depth of the devices themselves.

In cinematography, filming using a moving camera inherently introduces a plurality of views, but this does not produce a parallax error because the plurality of views are displayed over time rather than simultaneously. No stitching is necessary, and therefore no alignment problems arise. However, if multiple cameras are used, then the parallax errors discussed above occur and for the same reasons.

Some solutions to parallax error utilize a camera overlap formation, including a traditional two image overlap and a three image overlap. The two image formation uses a timing algorithm in order to reduce errors. However, mere timing algorithms only assist in obtaining shots that are likely to overlay in a less problematic fashion.

What is needed is a camera device and configuration, specifically a placement and orientation of cameras, that reduces these parallax errors and which does not rely heavily on algorithmic assistance and/or manual correction.

SUMMARY

It is desirable to have a system that can capture multiple directions simultaneously while reducing optical errors which result in parallax. Furthermore, it is desirable to have a system that arranges all of the cameras close to each other on a common plate. Still, further, it is desirable to have multiple nodal formations nested together on the common plate. The disclosed system advantageously fills these needs and addresses the aforementioned deficiencies by providing camera configurations that result in images at substantially overlapping angles in every direction.

Disclosed is a camera array system comprising a plurality of outward-facing camera clusters mounted on a plate structure and surrounding an upward-facing camera. The disclosed system is unique when compared with other known systems and solutions in that it provides camera configurations that result in images at substantially overlapping angles in every direction. The nodal formations of outward-facing camera clusters are arranged every 90 degrees around a center of the plate and provide superior coverage and less distortion compared to similar systems. A key feature of the nodal formations is the intersecting of the angles of view, which provide not only more complete coverage of the objects which are closest to a given nodal formation, but also ensure an overlap of coverage, specifically a panoramic overlap, with the footage captured by adjacent nodal formations. The system can provide image data, quality and stability that is necessary for utilization in modern visual effects and software environments.

This disclosure will now provide a more detailed and specific description that will refer to the accompanying drawings. The drawings and specific descriptions of the drawings, as well as any specific or alternative embodiments discussed, are intended to be read in conjunction with the entirety of this disclosure. The Camera Array may, however, be embodied in many different forms and should not be construed as being limited to the embodiments set forth herein; rather, these embodiments are provided by way of illustration only and so that this disclosure will be thorough, complete and fully convey understanding to those skilled in the art.

DETAILED DESCRIPTION

Figure 1:
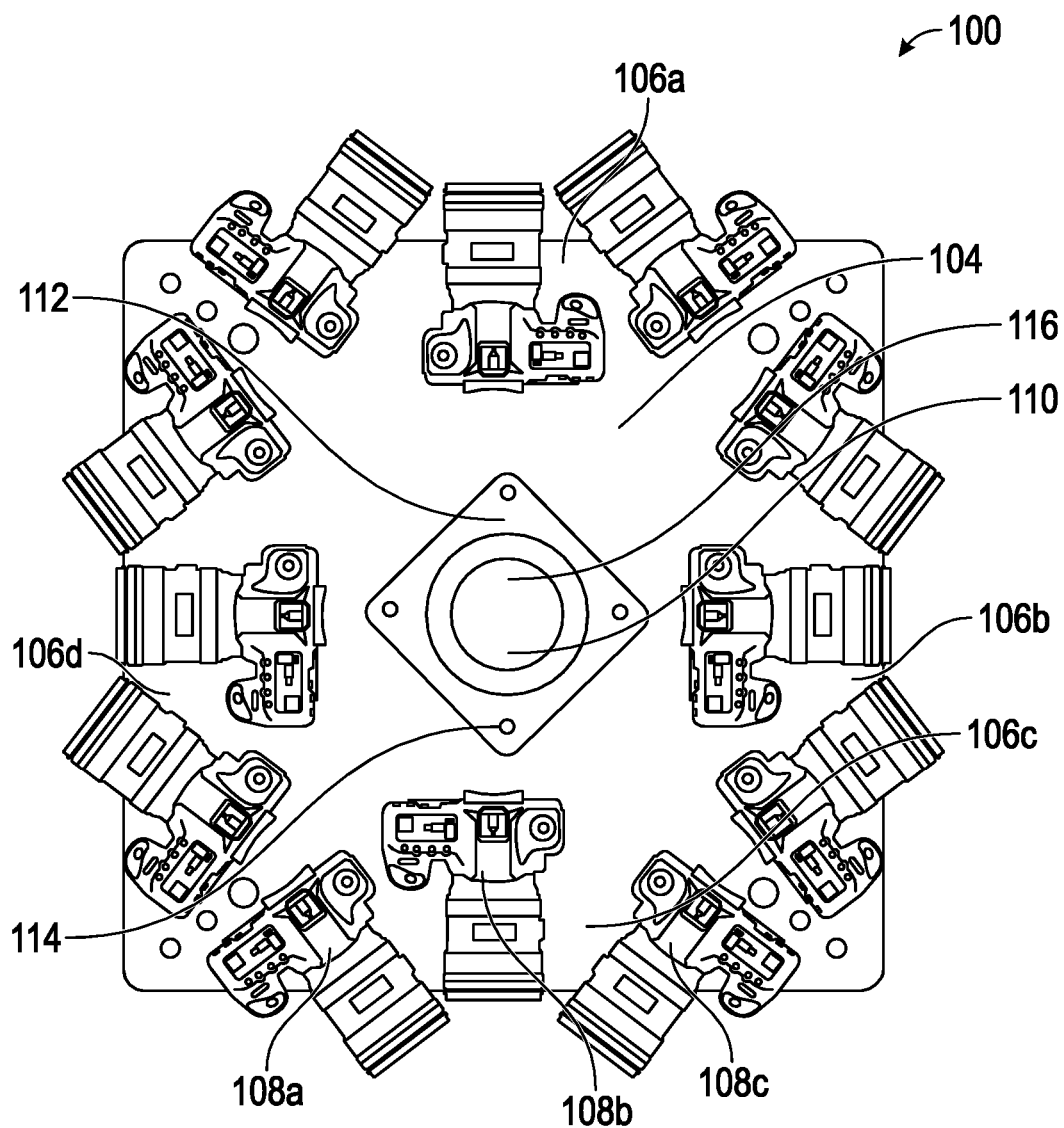
FIG. 1 shows a top view of the system without the video converter boxes connected to the cameras.

The present invention is directed to a system featuring an array of camera arrays configured to capture at least 360 degrees of views from a moving vehicle.

In its most complete version, the system is made up of the following components: a plurality of cameras arranged on each side of a plate structure and connected to a common trigger box and viewing monitor, levelling screws to facilitate the leveling of the plate structure, cut-out features that provide access to the battery of each camera, a lidar and a method of capturing lidar information in conjunction with camera images, and rigid mounts for each camera. These components are combined together to create an architecture for the system that has the ability to capture images at an increased reduction of parallax while providing for a stable image. It should further be noted that the electronic trigger, monitor, leveling screws, battery slots and anti-drift mounts will provide ease of use for the operator and the lidar data will help augment the spatial relation of each image to the others. The spatial relations of the images assist in stitching them together, when necessary.

The cameras will be mounted in four clusters of three along each side of the plate. Thus, each cluster may have a left camera, a middle camera, and a right camera. The four clusters in their nodal formation provide for substantial overlap of the images on each side, thereby reducing parallax. Indeed, the cameras that form each cluster, placed closely and adjacently to each other, are directed toward a point of intersection such that the direction and view of the left camera and right camera cross the direction and view of the middle camera—thus, the angles of views, which are conceptual lines that are positioned and oriented in the very center of views, intersect. Also, the plurality of clusters enable at least a partial overlap of view, not only within each cluster, but between clusters as well. This is because cameras in adjacent clusters may have parallel angles of views.

The plate itself, which via mounting places the cameras on the same horizontal plane, yields two types of overlaps— the first being an overlap of view between one camera with another camera in an adjacent cluster (parallel angles of view), and the second being an overlap of view—but not of angles—between cameras within a cluster. In the latter type of overlap, the angles of view intersect. The common and stable horizontal plane promotes improved outcomes when the images are used to construct 3d and virtual reality spatial environments. In order to supplement the various overlaps in view of the camera array, another camera is placed at the center of the plate and elevated above the plate (and the camera clusters). This camera is directed upward, thereby providing a sky-view to complement the lateral views of the outward-facing camera clusters. Thus, the camera array may feature four outward-facing camera clusters and one upward-facing camera cluster.

Increasing the overlap is possible by increasing the number of clusters or increasing the number of cameras within each cluster. However, doing so will result in increased material and process costs as well as an increased complexity in processing the captured images. Conversely, the number of clusters or the number of cameras within each cluster may be decreased to reduce the aforementioned costs, although this may occur at the expense of the quality of the footage and an increase in parallax errors. It is crucial that the camera views overlap between clusters in order to obtain panoramic coverage from cameras having a common directional view, and that the angles of view intersect within each cluster in order to obtain complete visual information regarding the objects before it. At the same time, the intersection of the angles of view is what enables the overlap between adjacent clusters.

Therefore, in a camera array system of four clusters of three cameras each, the camera angles of view (which may also be understood as the "directions" which the cameras face) of cameras within each cluster should diverge at least fifteen degrees between adjacent cameras, with the "wing" cameras, which are disposed on either side of the "middle" camera, diverging at least thirty degrees. It is preferred for each wing camera to diverge around forty-five degrees from the middle camera so as to diverge ninety degrees from each other. By diverging ninety degrees from each other, a wing camera will maintain the same angle of view as another wing camera in the cluster ninety degrees from its own cluster. Thus, a sufficient degree of divergence guarantees that a wing camera in one cluster will not only overlap in view with a wing camera in an adjacent cluster, but also have common (i.e., parallel) angles of view.

A camera array system of four clusters of four cameras each is similar, except that divergence of angles of view between adjacent cameras may be less while still maintaining the features described above. Thus, the divergence may be as low as ten degrees, but is preferably 22.5. Conversely, a camera array system of four clusters of two cameras may feature a divergence of seventy degrees, although preferably the divergence is ninety degrees.

An electronic trigger relay may be coupled to each camera to provide a simultaneous signal to start or stop capturing footage. The control switch for the electronic trigger relay will be of a length sufficient to permit the operator to control the cameras without having to reach far. Indeed, the control switch for the electronic trigger may be situated remotely, on a central controller, and the central controller may be shaped ergonomically. The electronic trigger relays may be physically mounted to each camera and in instructional communication with the central controller, or the electronic relays may be incorporated into the central controller and in wireless instructional communication with the cameras.

A central monitor system may comprise relay boxes mounted above the cameras and configured to transmit signals from each camera to a common receiver, with the common receiver configured to collate the signals into an image. The central monitor system may include a display screen configured to display the image in real-time. Thus, the central monitor system may permit an operator to view all camera images at once without needing to be at camera level, thereby providing ease of use when the system is mounted high above the operator's head.

The central monitor system may isolate and group sets of cameras within the clusters, such that the footage from a camera within a first cluster will be grouped with the footage from a camera within a second cluster. In particular, footage captured from cameras having the same angle of view may be grouped together in order to obtain overlapping coverage.

The plate structure, i.e., the double plate design consisting of a top and bottom plate, may be advantaged by the inclusion of leveling screws installed at the corners of and between the plates. The levelling screws enable fine adjustments to the horizontal level once all the cameras are mounted on the plate. The levelling screws may comprise a set of rotatable discs threadedly fitted to screws, enabling a change in height via rotation. Three screws within a leveling screw unit enable a planar tilt. Slots may be cut out of the top plate allowing for access to the battery compartment of each camera once mounted. This configuration enables the operator to access the camera battery compartment while ensuring that the camera position does not change once it is mounted to the plate.

While the plate structure, including the top and bottom plates, may be square to better fit a camera array of four clusters, other shapes may provide certain advantages to other array sets. Other conceivable shapes include a circle, a triangle, or other polygons, with the number of sides being equal to the number of clusters.

In one version, 1 to 3-axis gimbals may be mounted at the corners under the bottom plate and provide additional stability to the cameras when the system is in motion, thereby ensuring that a clean image will be captured without aberrations or distorted images. In another version, lens stabilizers are utilized to maintain image clarity and the gimbals are omitted.

A large central cut out on the bottom plate will provide access to the top plate for access to the battery compartments and also for the addition of pins which will be used to attach stabilization rods.

A lidar unit will mount in the center of the system and will sit above the cameras. The lidar data will assist with spatial construction of the captured camera images in 3d software suites. The lidar may communicate distance-related data to the central controller for further processing.

FIG. 1 is a top view of the system 100 with the 13 cameras mounted to the top plate 104 in their respective positions. There are four clusters 106a, 106b, 106c, 106d of three cameras 108a, 108b, 108c arranged in a nodal formation and mounted on the plate every 90 degrees. The center 110 of the plate has a hole through which wires can be connected and through which additional mounting brackets can be placed from underneath. Above the hole is mounted a platform 112 supported by four pins 114 upon which sits a lidar and the 13th camera 116, with the 13th camera mounted to the platform via an L-bracket, with the L-bracket in turn mounted on top of the lidar. The 13th camera is configured to capture the overhead imagery when the system is in use.

Figure 2:
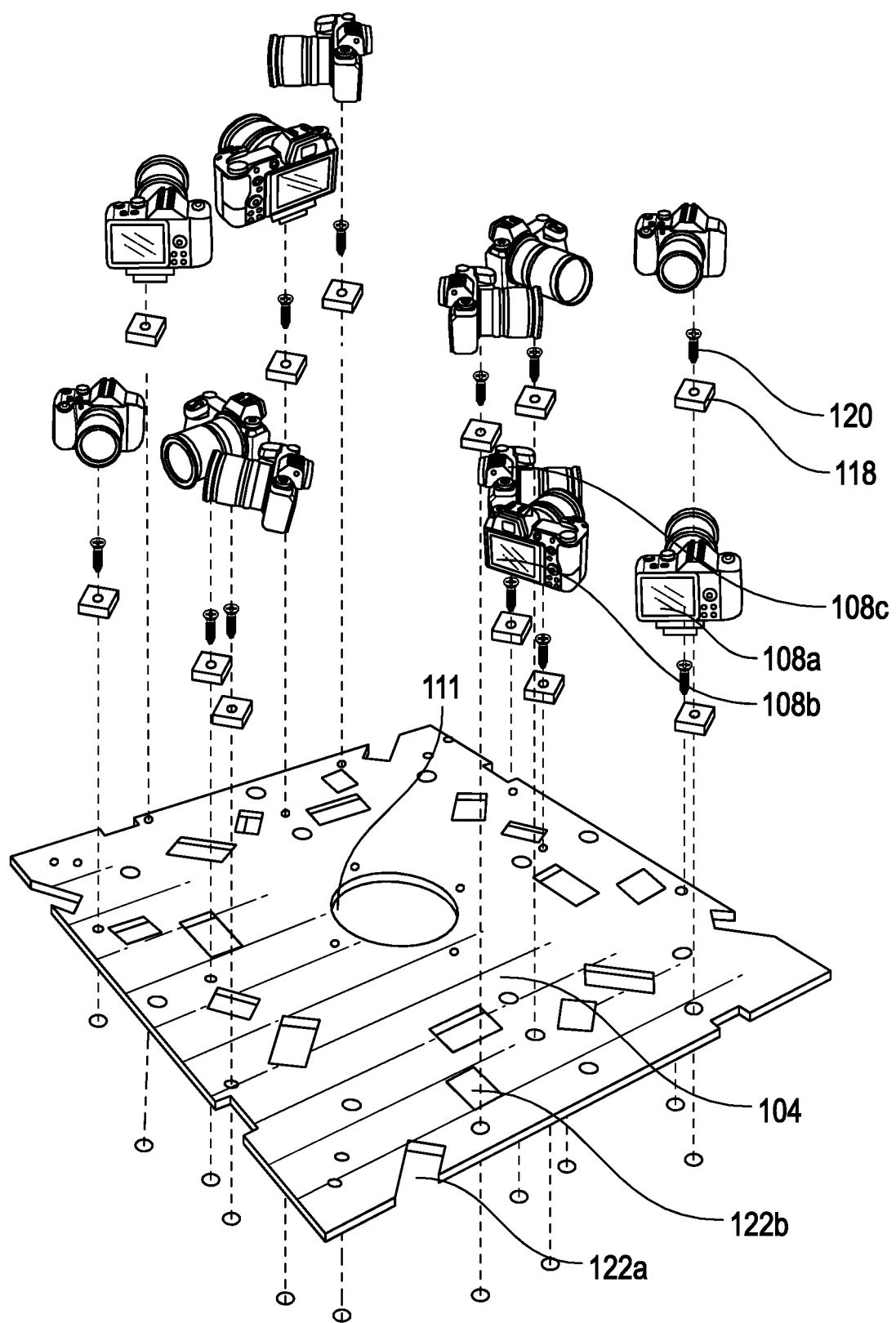
FIG. 2 shows an exploded view of the system with the nodal formation cameras and their respective mounts.

FIG. 2 is an exploded view of the top plate 104 along with the connections needed in order to mount the cameras 108a, 108b, 108c onto the top plate Various rectangular cutouts 122a in the plate are used for access to the battery compartment of each camera after each camera is mounted into position. In one version, each camera has a quick release mount 118 that is connected to the top plate via a bolt 120. An anti-drift plate is mounted to the underside of each of the 12 horizontal cameras and the anti-drift plate is then connected to the quick release plate. Additional slots 122b are also cut into the surface of the plate in order to accommodate a safety lever on the quick release plate. However, in a preferred version, the camera is mounted directly to the top plate and the safety lever and its corresponding slot are omitted.

The hole in the center 111 may be seen when the platform is not attached to the top plate.

Figure 3:
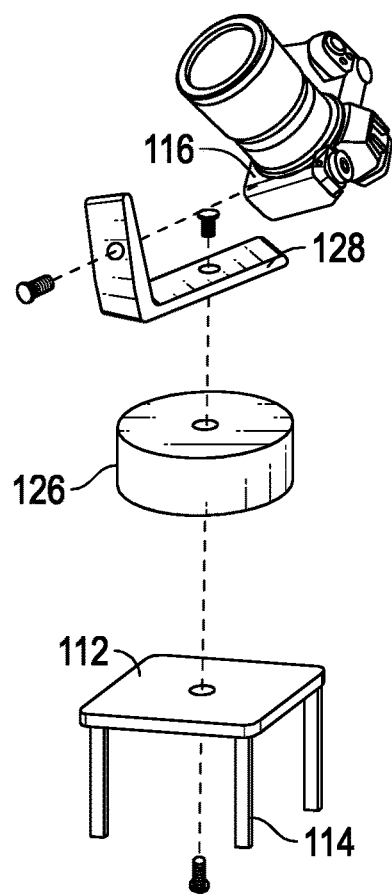
FIG. 3 shows an exploded view of the platform that connects to the top plate and which supports the lidar and overhead camera.

FIG. 3 shows an exploded view of the platform 112 along with the lidar 126 and the 13th camera 116. The lidar is mounted to the platform via a bolt. An L-bracket 128 is then mounted on top of the lidar. Lastly, the camera is mounted onto the L-bracket so that it can be oriented upward. The pins 114 of the platform 112 can be adjusted in order for the lidar to clear the height of the surrounding cameras that are mounted on the perimeter of the platform.

Figure 4:
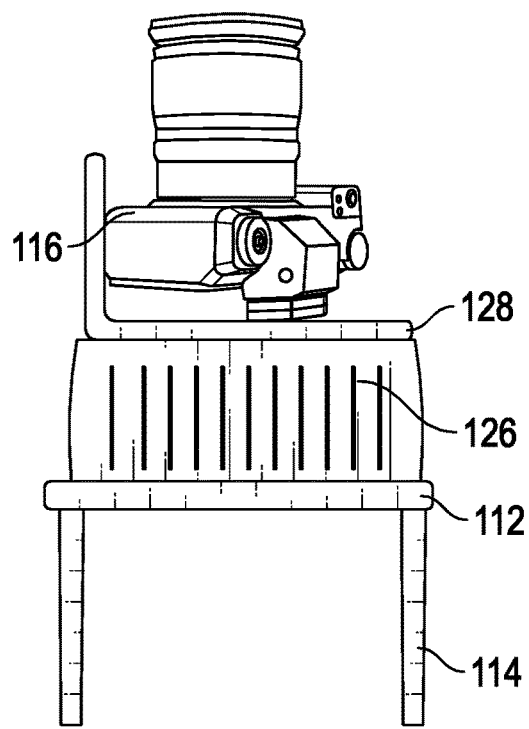
FIG. 4 shows a side view of the platform that connects to the top plate and which supports the lidar and overhead camera.

FIG. 4 shows the configured view from the side of the platform 112 with the lidar 126 and camera 116 mounted. The pins 114 of the platform provide space that allows the cords running from the cameras to the operator to pass. The lidar sits above the platform so that it can capture data in 360 degrees while the system is in use. The camera is mounted via an L bracket 128 to the top of the lidar.

Figure 5:
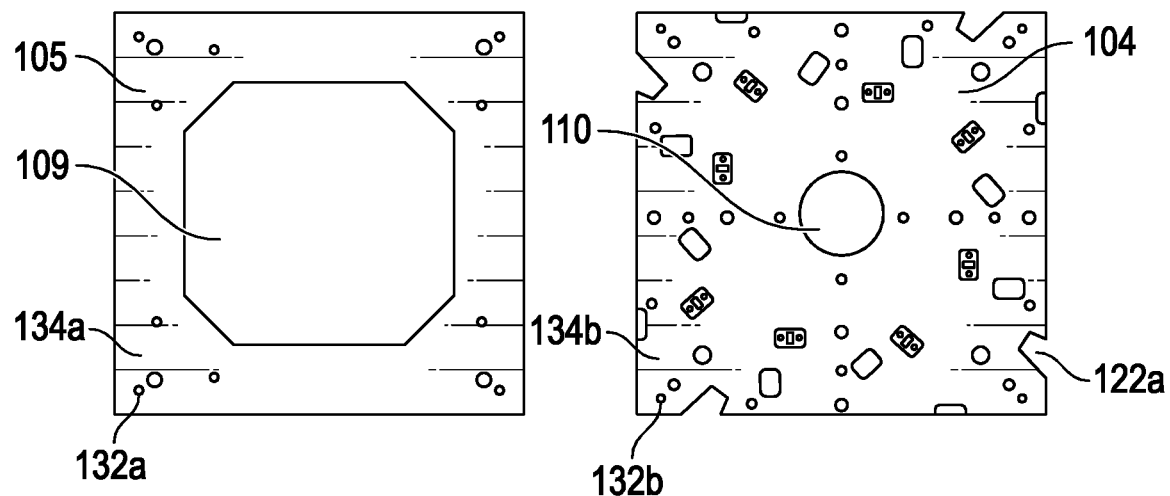
FIG. 5 shows a top view of both the bottom plate (right) and the top plate (left).

FIG. 5 is a top view of the bottom plate (left) 105 and the top plate (right) 104 of the system. The bottom plate features a large cutout 122c in order to provide access to the underside of the top plate. Holes 132a, 132b are placed at the corners 134a, 134b of both the top and bottom plate which provide mounting points for the adjustment screws that are mounted between the plates. The bottom plate also provides holes 109 in order to mount a stabilization gimbal at each corner or in order to attach the bottom plate to a vehicular mount. The top plate 104 is configured to mount the 12 horizontal cameras in nodal formation on each side. The plate provides cutouts 122a in order for the operator to access the battery compartment of each camera while mounted. There is a center hole 110 in the top plate through which cables can be connected to remote units and holes are provided through the plate in order to mount the leveling screws and platform.

Figure 6:
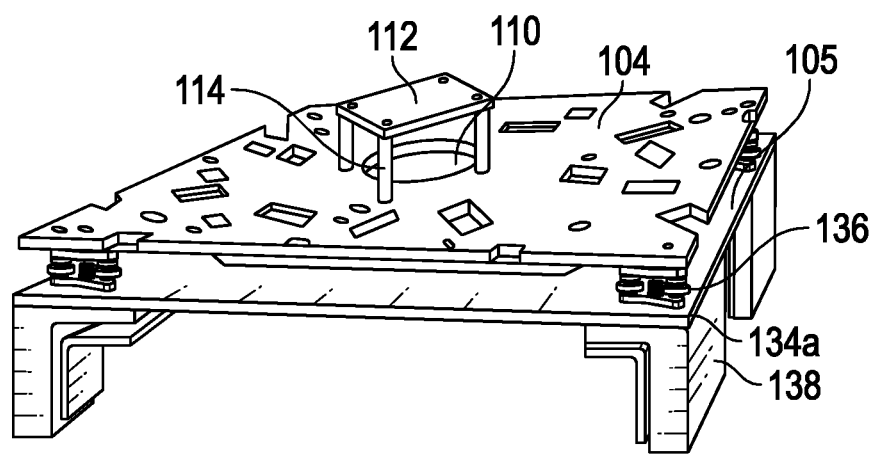
FIG. 6 shows a perspective view of the mounting plates without the cameras.

FIG. 6 is a perspective view of the assembly of the top plate 104, bottom plate 105, leveling screw 136, stabilizing gimbals 138 and platform 112. The stabilizing gimbals are positioned at the corners 134b of the bottom plate in order to provide the most stability possible should the system be moving while in use. The leveling screws are also positioned near the corners 134a and are connected to the top plate. This allows the operator to conduct any fine leveling adjustments needed after the initial mounting of the system has been completed. In a preferred version, the gimbals may be omitted and the bottom plate may be attached directly to a vehicular mounting bracket. There is a large hole in the bottom plate and a smaller hole (the center hole) 110 in the top which provides access for cables to be passed through. The platform 112 has four pins 114 which sit higher than the surrounding cameras when they are mounted in order to capture lidar data.

Figure 7:
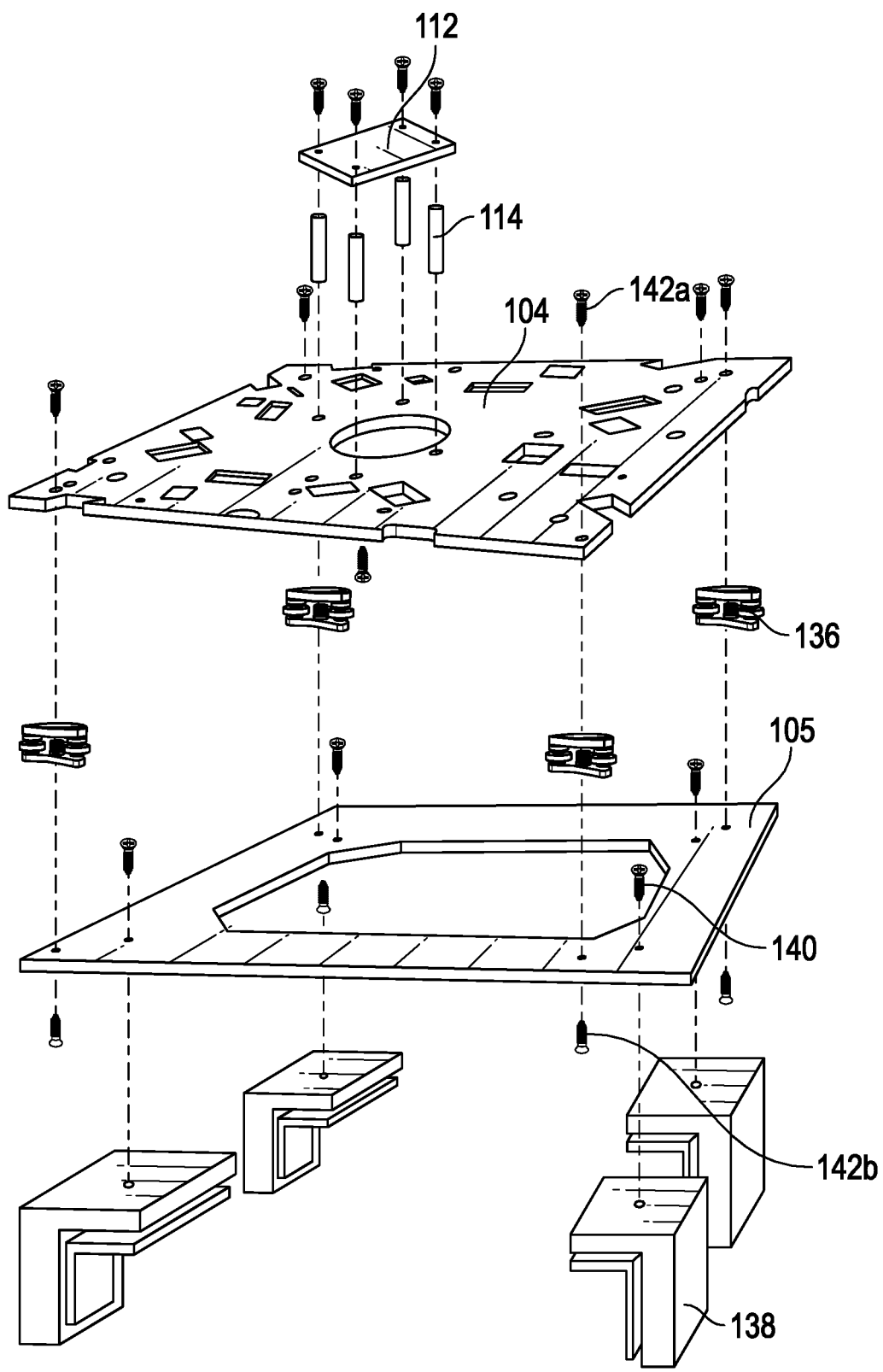
FIG. 7 shows an exploded view of the mounting plates without the cameras.

FIG. 7 is an exploded view of the assembly of the top plate 104, bottom plate 105, platform 112, leveling screws 136 and stabilizing gimbals 138. The stabilizing gimbals are connected to the underside of the bottom plate with a bolt 140. The leveling screws are connected to both the top and bottom plates with a bolt 142a, 142b on each end. Discs 144 embedded into the leveling screw rotate clockwise or counterclockwise in order to lengthen or shorten the (leveling) screw. A plurality of discs surround an approximate center of each levelling screw to enable a planar tilt of upper and lower levels of each levelling screw. As each levelling screw's length and planar tilt is changed the overall balance and level of the top plate is assessed and adjusted. The platform 112 is mounted to the top plate with bolts connected to pins 114. Different lengths of pins can be used for the event that the height of the lidar needs to be adjusted.

Figure 8:
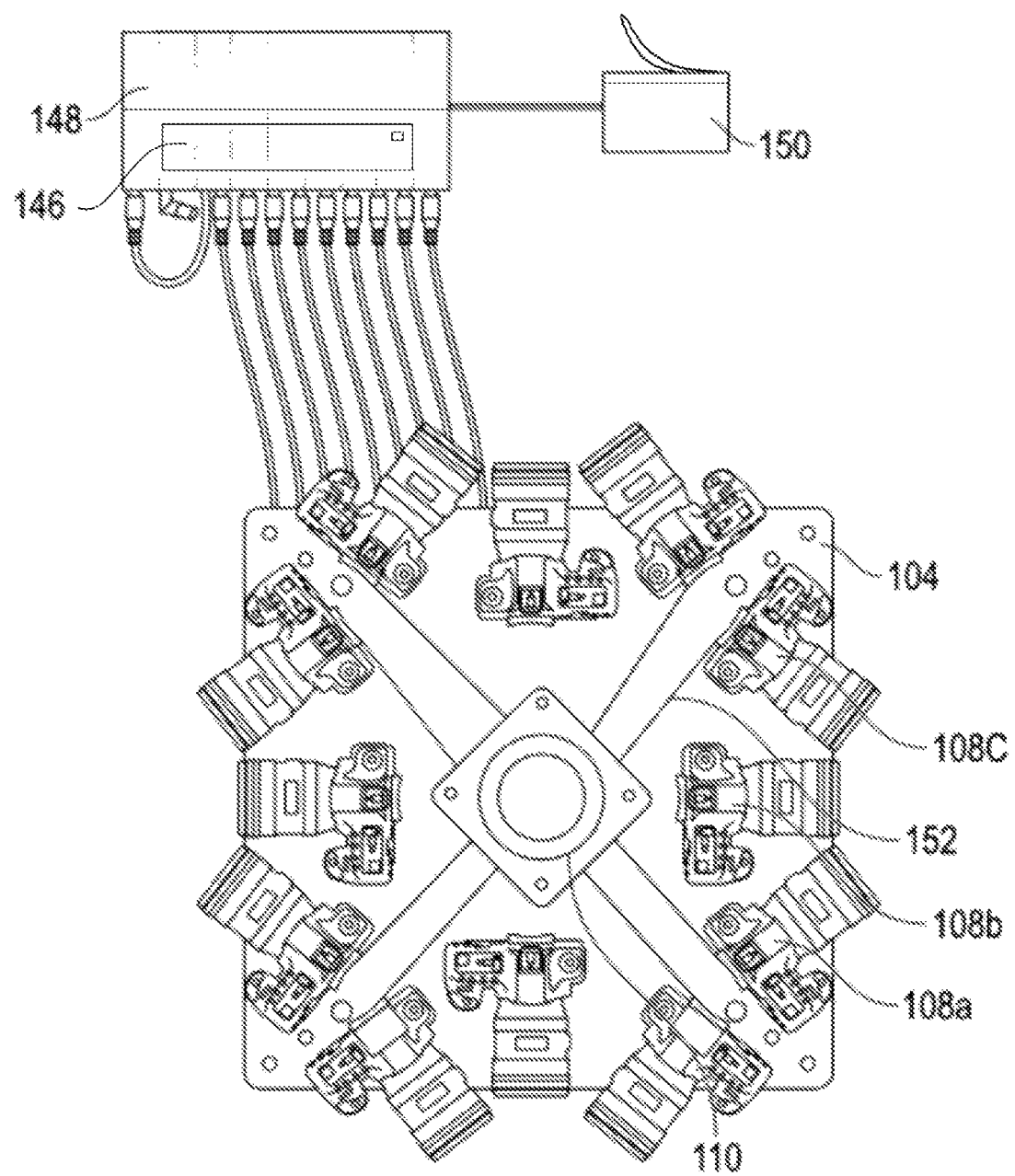
FIG. 8 shows the electronic trigger relay leading from the camera to the control box and trigger.

FIG. 8 shows the top view of the cameras 108a, 108b, 108c mounted on the top plate 104 with the electronic trigger relay 146 connected from the camera, to a central relay box 148 and then to a central trigger 150. The electronic trigger box allows simultaneous activation of the cameras from a central source so that the operator has adequate control over all the cameras at once. The figure shows a cable 152 running from each camera to the hole located at the center 110 of the plate. The cables then pass through the holes in the top and bottom plates and are connected to a common electronic relay box. The box is then connected to a single trigger that sends a signal to the cameras to begin recording all at the same time. The trigger will then send a signal when image capture is complete in order pause the cameras. The trigger may connect to the cameras via the cables, but in a preferred version, the trigger and cameras are coupled remotely and wirelessly, with the trigger wirelessly engaged to receiver boxes connected to each camera. The trigger, in turn, may be attached to otherwise incorporated into the central relay box, which may be a handheld device enabling centralized and remote control across the camera array. Accordingly, both the cables and the hole through which they pass may be omitted. The platform and pin structure may be replaced by an elevated platform of any shape.

Figure 9:
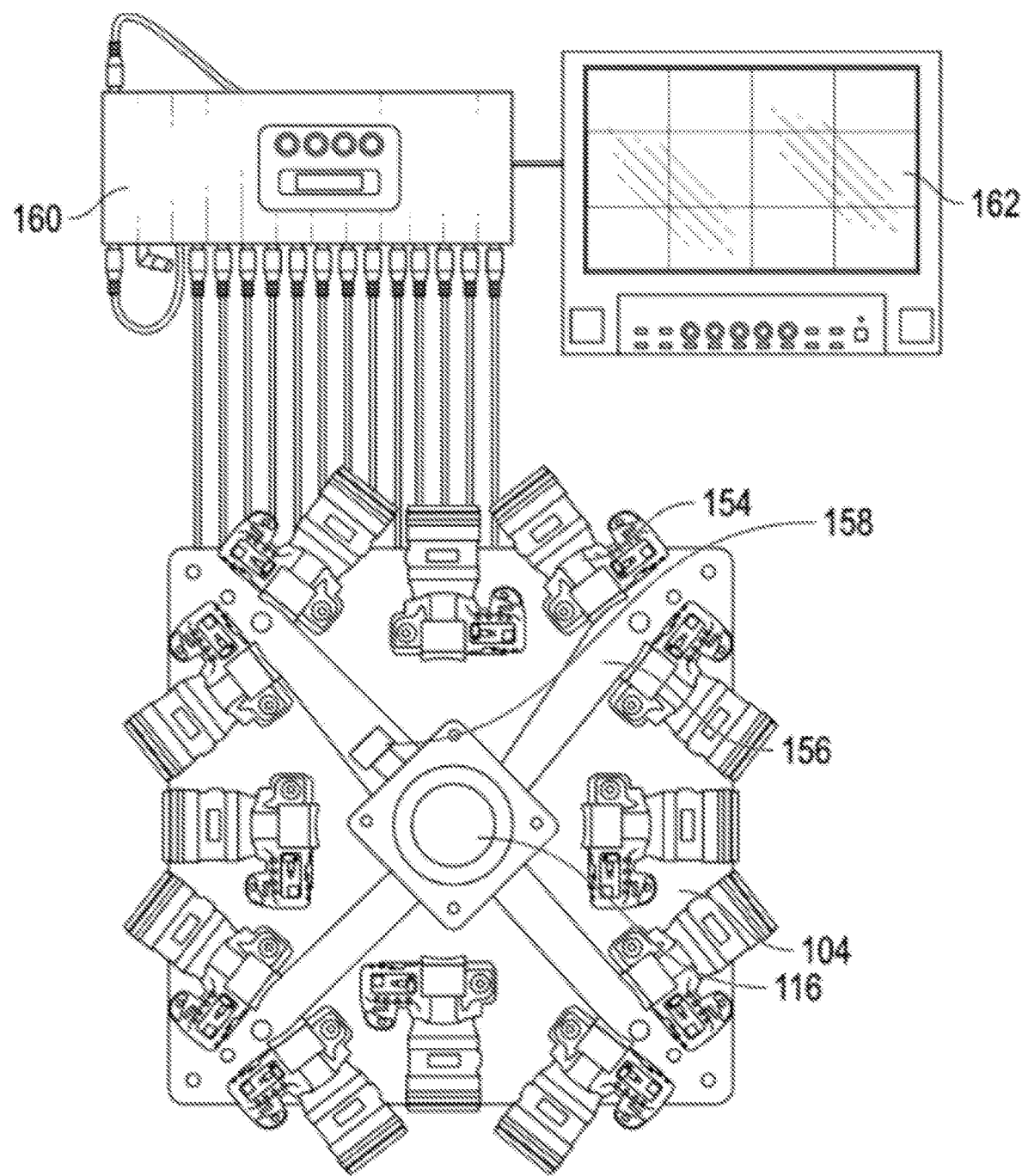
FIG. 9 shows a monitor system in which visual data is communicating from the cameras to the video converter boxes, and from the video converter boxes to the monitor.

FIG. 9 shows a top view of the cameras mounted on the top plate 104 with the video converter boxes 154 attached to the "hot shoe" mount on the top of each camera. An additional video converter box 158 is mounted to the top plate itself for the overhead camera 116. The video converter boxes connect to the cameras and send a video signal through a cable 156 to a central control box 160. The central control box then connects to a video monitor 162 which can provide images of one, some or all cameras on the same screen at the same time in order for the operator to check the status of each camera without needing to be above the top plate.

Figure 11:
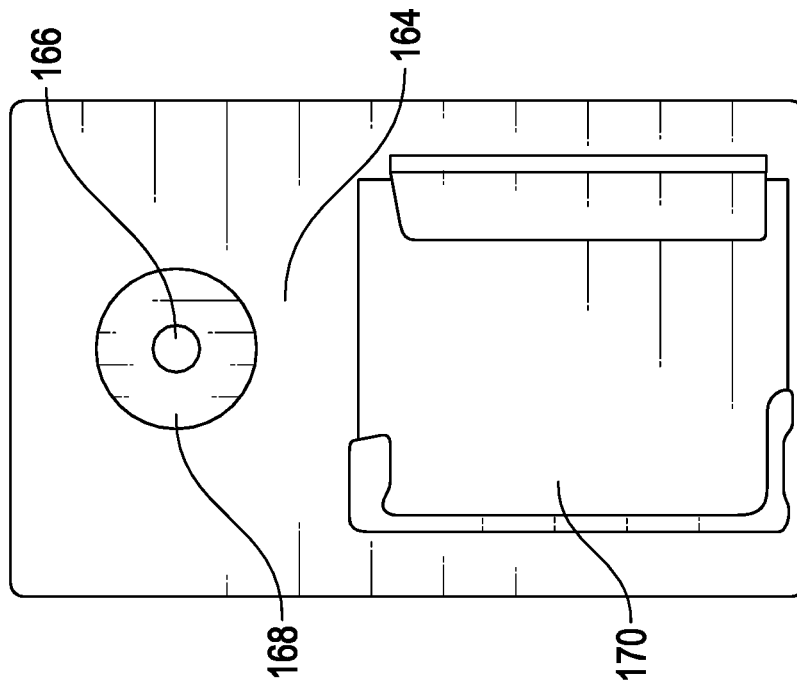
FIG. 11 shows a bottom view of the anti-drift camera mounting plate.
Figure 12:
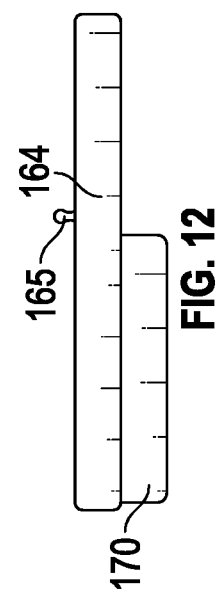
FIG. 12 shows a side view of the anti-drift camera mounting plate.
Figure 10:
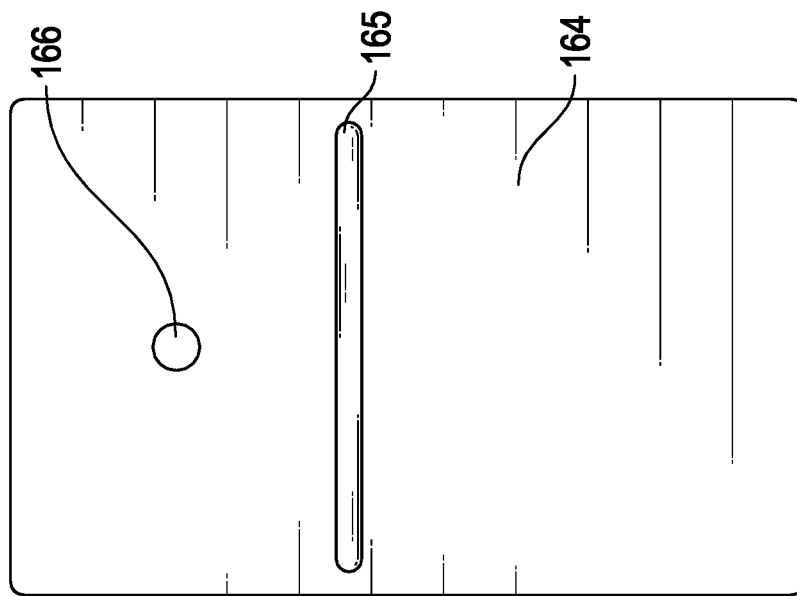
FIG. 10 shows a top view of the anti-drift camera mounting plate.

FIGS. 10-12 show components that may be omitted, depending on the stabilization methods, techniques, and components incorporated elsewhere in the system.

FIG. 10 shows a top view of the anti-drift plate 164 that connects to the bottom of each of the horizontal cameras on the top plate. This side of the plate has a hole 166 through which a bolt connects to the underside of the camera. The camera would sit on top of this plate and, after mounting the plate via the bolt through the hole, the rigid bulk of material situated across the body of the unit will keep the camera in one position. Without the material on the surface of the mount, the camera will have a tendency to rotate around the bolt hole and change position. The rigid bar 165 on the surface of the mount prevents the camera from drifting, especially when it is filming while moving on a vehicle.

FIG. 11 is the bottom view of the anti-drift plate 164. The hole 166 has a recess 168 to prevent the head of the bolt from hanging down below the underside of the plate. The lower portion of the plate, a quick release mounting surface 170 is the shape that will engage the quick release plate on the top plate of the system in order to fully mount each camera.

FIG. 12 is a side view of the anti-drift plate 164 which shows the rigid bar 165 running across the surface of the plate which prevents the camera from rotating around the mounting hole. On the underside of the plate is the mounting surface 170 which engages the quick release plate on the top plate of the system.

Figure 13:
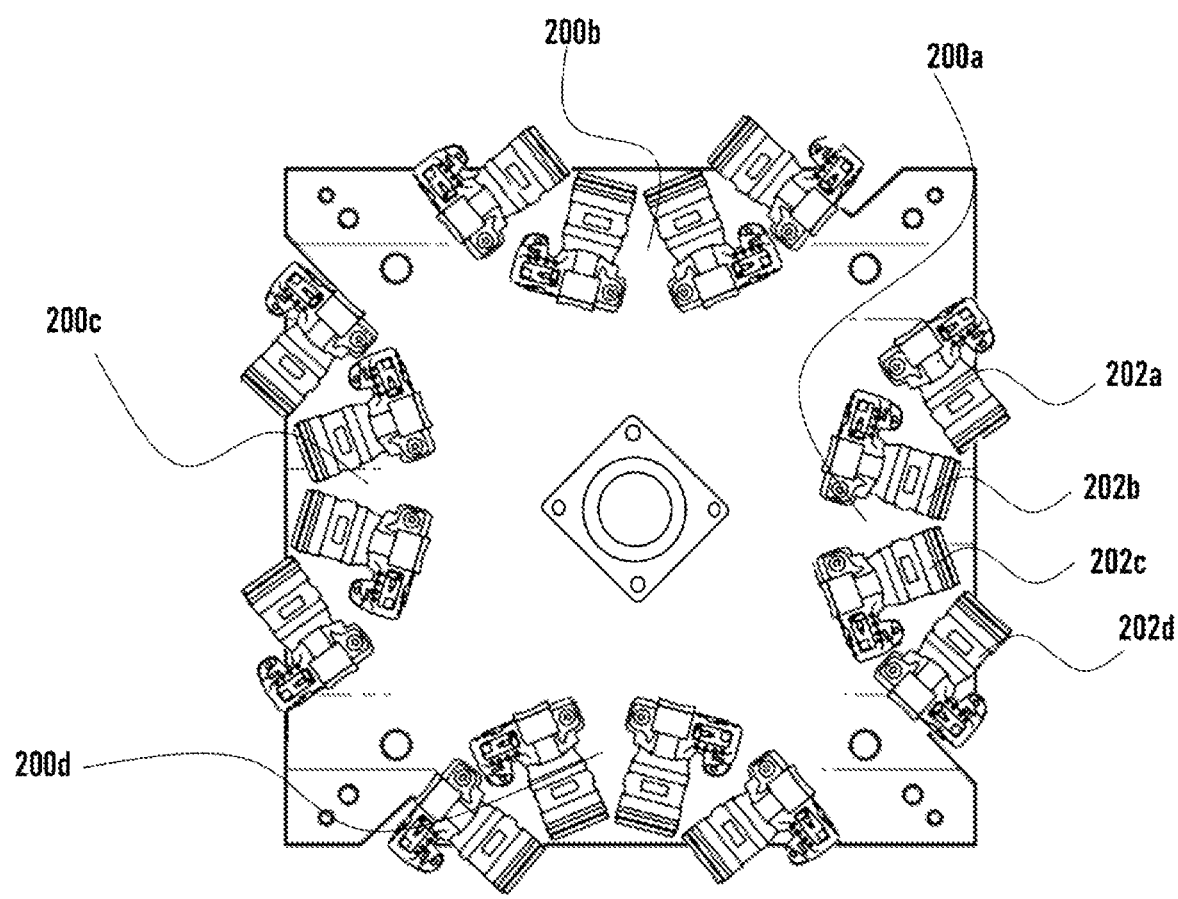
FIG. 13 shows a top view of a camera array system with four outward-facing camera clusters of four cameras each.

FIG. 13 is a top view of a camera array system with four outward-facing camera clusters 200a, 200b, 200c, 200d of four cameras 202a, 202b, 202c, 202d each.

Figure 14:
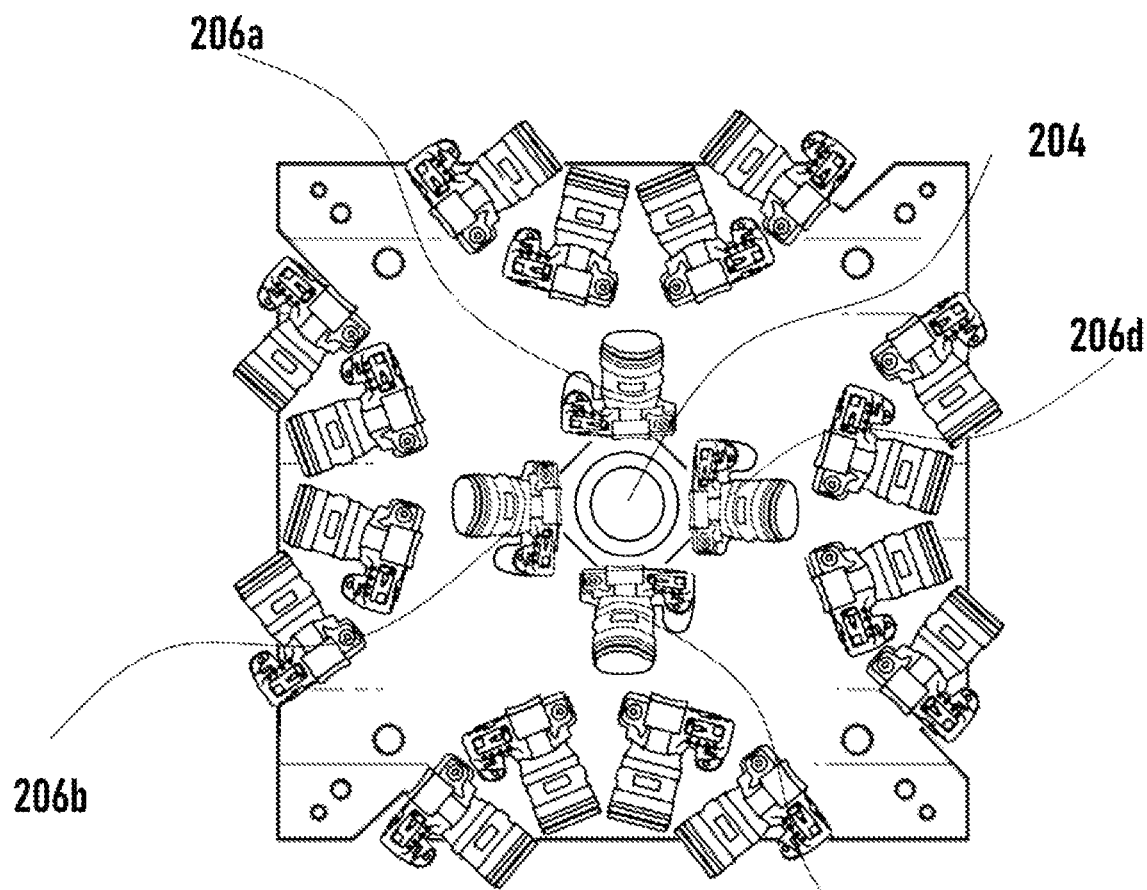
FIG. 14 shows a top view of a camera array system with an upward-facing camera cluster of five cameras.
Figure 15:
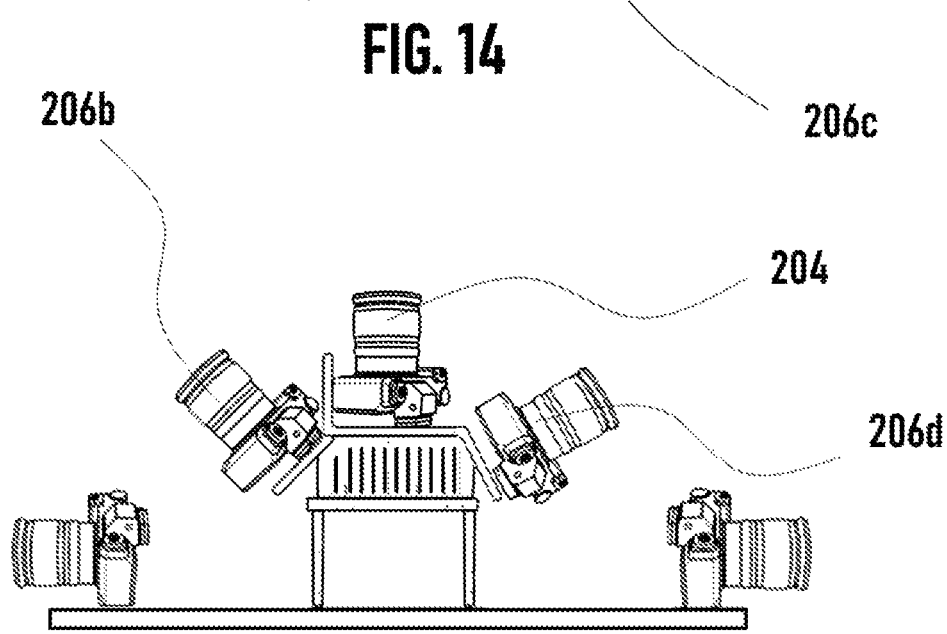
FIG. 15 shows a side view of a camera array system with an upward-facing camera cluster of five cameras.

FIG. 14-15 show a top and side view of a camera array system with an upward-facing camera cluster 204 of five cameras 206a, 206b, 206c, 206d.

Figure 16:
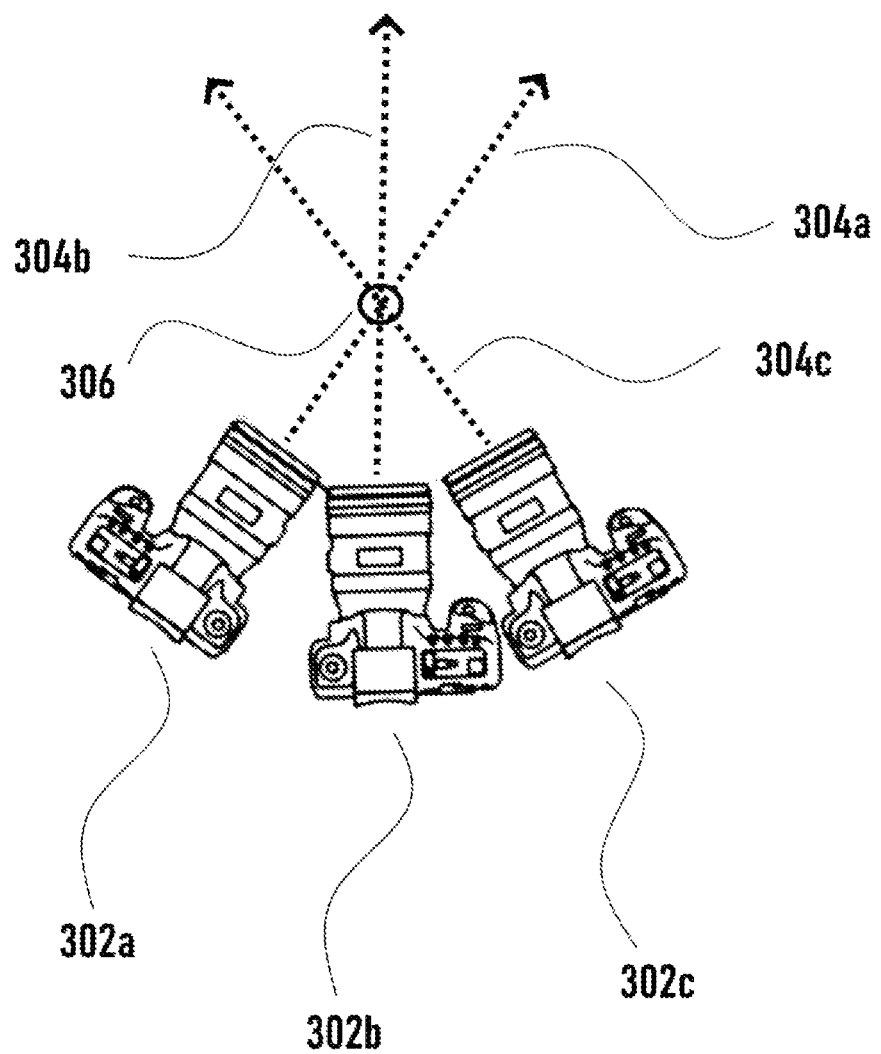
FIG. 16 shows a camera cluster with the corresponding angles of view and the point of intersection.

FIG. 16 shows a camera cluster of three cameras 302a, 302b, and 302c, with the corresponding angles of view 304a, 304b, 304c, and the point of intersection 306.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments.

It is to be understood that this disclosure is not limited to any single specific embodiments or enumerated variations. Many modifications, variations and other embodiments will come to mind of those skilled in the art, and which are intended to be and are in fact covered by this disclosure. It is indeed intended that the scope of this disclosure should be determined by a proper legal interpretation and construction of the disclosure, including equivalents, as understood by those of skill in the art relying upon the complete disclosure present at the time of filing.

The invention claimed is:

1. A camera array system comprising a plurality of cameras, a plate structure, an elevated platform, and a central controller,
   a. with the plate structure comprising a top plate, the top plate having a center and a periphery;
   b. with the elevated platform mounted to the center of the top plate and extending above the top plate;
   c. with the plurality of cameras arranged in a plurality of camera clusters, the plurality of camera clusters including first, second, third, and fourth outward-facing camera clusters and an upward-facing camera;
      i. with the four outward-facing camera clusters being attached to and disposed on the periphery of the top plate at points approximately 0, 90, 180, and 270 degrees around the center of the top plate;

ii. with each of the four outward-facing camera clusters comprising a middle camera, a left wing camera, and a right wing camera;
1. with the left wing camera facing a first direction, the middle camera facing a second direction, and the right wing camera facing a third direction;
2. with the first direction diverging 15-60 degrees from the second direction, the second direction diverging 15-60 degrees from the third direction, and the third direction diverging 30-120 degrees from the first direction;
iii. with the upward-facing camera attached to and disposed on the elevated platform and facing a direction substantially orthogonal to the first, second, and third directions;
d. with the central controller coupled to each camera and configured to provide simultaneous signals to each camera to start or stop recording.

2. The camera array system of claim 1, with the periphery being substantially square and having four corners and four sides, with one of the four outward-facing camera clusters disposed on each of the four sides.

3. The camera array system of claim 1, with the central controller coupled wirelessly and remotely to each camera.

4. The camera array system of claim 1, with the plate structure configured to attach to a vehicle via a vehicular mounting bracket.

5. The camera array system of claim 4, with the plate structure additionally comprising a bottom plate, with the bottom plate being attached to the top plate via levelling screws, with the levelling screws configured to adjust the tilt of the bottom plate vis-à-vis the top plate.

6. The camera array system of claim 4, with the moving vehicle being an automobile.

7. The camera array system of claim 1, with the cameras configured to transmit visual data to a display system, the display system comprising a receiver and a display screen,
a. with the receiver configured to receive the visual data from the cameras and transmit the visual data to the display screen and the display screen configured to display the visual data such that visual data from each camera is displayed simultaneously on the display screen.

8. A camera array system comprising a plurality of cameras and a top plate;
a. with the top plate configured to attach to a vehicle and having a center and a periphery;
b. with the plurality of cameras arranged in a plurality of camera clusters, the plurality of camera clusters including first, second, third, and fourth outward-facing camera clusters;
i. with the four outward-facing camera clusters being attached to and disposed on the periphery of the top plate;
ii. with the first outward-facing camera cluster positioned at a point approximately 0 degrees around the center of the top plate, the second outward-facing camera cluster positioned at a point approximately 90 degrees around the center of the top plate, the third outward-facing camera cluster positioned at a point approximately 180 degrees around the center of the top plate, and the fourth outward-facing camera cluster positioned at a point approximately 270 degrees around the center of the top plate;
iii.
iv. with each camera in the outward-facing camera clusters facing substantially away from the center of the top plate and in directions having a common plane;
v. with each outward-facing camera cluster comprising a left camera and a right camera, with the left camera having a first direction and a first field of view and the right camera having a second direction and a second field of view;
vi. with the first direction being an optical axis of the left camera and passing orthogonally through a center of the first field of view;
vii. with the first direction being an optical axis of the right camera and passing orthogonally through a center of the second field of view;
viii. with the first direction and second direction within each outward-facing camera cluster having a point of intersection;
ix. with the optical axis of the left camera of the first outward-facing camera cluster being substantially parallel to the optical axis of the right camera of the second outward-facing camera cluster, the optical axis of the left camera of the second outward-facing camera cluster being substantially parallel to the optical axis of the right camera of the third outward-facing camera cluster, the optical axis of the left camera of the third outward-facing camera cluster being substantially parallel to the optical axis of the right camera of the fourth outward-facing camera cluster, and the optical axis of the left camera of the fourth outward-facing camera cluster being substantially parallel to the optical axis of the right camera of the first outward-facing camera cluster.

9. The camera array system of claim 8, with the first direction diverging 75-105 degrees from the second direction.

10. The camera array system of claim 8, with each outward-facing camera cluster additionally comprising a middle camera, with the middle camera in the first outward-facing camera cluster having an optical axis approximately 90 degrees from the middle camera in the second outward-facing camera cluster, approximately 180 degrees from the middle camera in the third outward-facing camera cluster, and approximately 90 degrees from the middle camera in the fourth outward-facing camera cluster.

11. The camera array system of claim 8, with each outward-facing camera cluster comprising four cameras,
a. with each outward-facing camera cluster comprising a left wing camera, a left middle camera, a right middle camera, and a right wing camera, with the left wing camera facing a first direction, the left middle camera facing a second direction, the right middle camera facing a third direction, and the right wing camera facing a fourth direction;
b. with the first direction diverging 10-40 degrees from the second direction and the second direction diverging 10-40 degrees from the third direction, and the third direction diverging 10-40 degrees from the fourth direction, and the fourth direction diverging 30-120 degrees from the first direction;
c. with the first direction, second direction, third direction, and fourth direction having a point of intersection.

12. The camera array system of claim 8, with the plurality of cameras additionally comprising one or more upward-facing cameras.

13. The camera array system of claim 12, with the one or more upward-facing cameras comprising a primary upward-facing camera and a set of wing upward-facing cameras;
   a. with the first upward-facing camera facing a direction substantially orthogonal to a plane of the top plate;
   b. with the set of wing upward-facing cameras facing directions between 30-60 degrees from the plane of the top plate.

14. A camera array system comprising a plurality of cameras and a plate;
   a. with the plate having a center and a periphery and configured to attach to a moving vehicle;
   b. with the plurality of cameras arranged in a plurality of camera clusters, the plurality of camera clusters comprising outward-facing camera clusters;
      i. with the outward-facing camera clusters being attached to and disposed on the periphery of the plate at points surrounding the center of the plate;
      ii. with the upward-facing camera cluster attached to and disposed on the center of the plate;
      iii. with each outward-facing camera cluster comprising a left camera, a middle camera, and a right camera, with the left camera having a first direction and a first field of view, the middle camera having a second direction and a second field of view, and the right camera having a third direction and a third field of view;
      iv. with the first direction being an optical axis of the left camera and passing orthogonally through a center of the first field of view;
      v. with the second direction being an optical axis of the middle camera and passing orthogonally through a center of the second field of view;
      vi. with the third direction being an optical axis of the right camera and passing orthogonally through a center of the third field of view;
      vii. with the first direction, second direction, and third direction within each outward-facing camera cluster having a joint of intersection.

15. The camera array system of claim 14, the plurality of outward-facing camera clusters including first, second, and third outward-facing camera clusters,
   a. with each of the three outward-facing camera clusters being positioned at points approximately 0, 120, and 240 degrees around the center of the plate;
   b. with the middle camera being a left middle camera;
   c. with each of the three outward-facing camera clusters additionally comprising a right middle camera, the right middle camera having a fourth direction and a fourth field of view;
   d. with the fourth direction being an optical axis of the right middle camera and passing orthogonally through a center of the fourth field of view;
   e. with the fourth direction sharing a point of intersection with the first direction, the second direction, and the third direction within each outward-facing camera cluster.

16. The camera array system of claim 14, the plurality of outward-facing camera clusters including more than four outward-facing camera clusters, with the directional views of the cameras within each outward-facing camera cluster intersecting at a distance between 2 inches and 2 feet from the each set of cameras.

17. The camera array system of claim 15, with the point of intersection being at a distance between 2 inches and 2 feet away from the left middle camera.

18. The camera array system of claim 15, with the point of intersection being at a distance greater than 2 feet away from the left middle camera.

19. The camera array system of claim 1, additionally comprising a lidar, with the lidar disposed on and attached to the elevated platform, with the elevated platform having sufficient height to enable the lidar to capture spatial data without being obstructed by the outward-facing camera clusters.

20. The camera array system of claim 1, with the central controller configured to isolate and group together footage from cameras within clusters or footage from cameras in adjacent clusters with substantially matching directions of view.

* * * * *